United States Patent [19]

Nishikawa

[11] 4,227,225
[45] Oct. 7, 1980

[54] MAGNETIC HEAD ASSEMBLY

[75] Inventor: Kowhei Nishikawa, Yokohama, Japan

[73] Assignee: Matsushita Electric Industrial Co., Ltd., Osaka, Japan

[21] Appl. No.: 903,796

[22] Filed: May 8, 1978

[30] Foreign Application Priority Data

| May 12, 1977 | [JP] | Japan | 52-54898 |
| May 13, 1977 | [JP] | Japan | 52-55628 |
| May 13, 1977 | [JP] | Japan | 52-55629 |
| May 13, 1977 | [JP] | Japan | 52-55630 |
| May 13, 1977 | [JP] | Japan | 52-55631 |
| Jun. 2, 1977 | [JP] | Japan | 52-65358 |

[51] Int. Cl.³ .......................... G11B 5/12; G11B 5/20
[52] U.S. Cl. ..................................... 360/128; 360/126
[58] Field of Search ............. 360/125, 126, 128, 119, 360/122

[56] References Cited

U.S. PATENT DOCUMENTS

| 2,717,928 | 9/1955 | Nordyke, Jr. | 360/128 X |
| 2,769,036 | 10/1956 | Selsted | 360/128 X |
| 3,611,557 | 10/1971 | Hardardt et al. | 360/129 X |
| 3,614,830 | 10/1971 | Bate | 360/126 |
| 3,679,839 | 7/1972 | Suzuki | 360/126 |
| 3,881,194 | 4/1975 | Heaslett | 360/125 |
| 3,893,189 | 7/1975 | Kronn | 29/603 |
| 3,978,523 | 8/1976 | Tanaka | 360/125 |
| 4,012,783 | 3/1977 | Hanaoka | 360/125 |
| 4,100,584 | 7/1978 | Behr | 360/125 |

Primary Examiner—John H. Wolff
Attorney, Agent, or Firm—Stevens, Davis, Miller & Mosher

[57] ABSTRACT

A magnetic head formed by coupling a plurality of U-shaped cores via a spacer plate close to both surfaces of a shield layer forming magnetic plates each with a width of the cores equal to a desired width of magnetic track, forming a spacer auxiliary slot in a shield plate comprising the magnetic plate and the spacer plate, bisecting the coupled cores to define a gap therebetween with reference to the auxiliary slot and forming a desired magnetic gap by interposing a spacer into the gap of the bisected cores.

7 Claims, 42 Drawing Figures

MAGNETIC HEAD ASSEMBLY

The present invention relates to a multi-channel magnetic head assembly which expedites the assembly thereof and facilitates the reduction of spacing between head elements.

Figure 1:
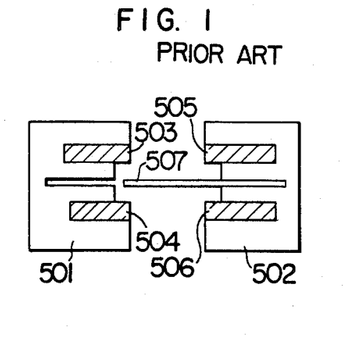
FIGS. 1 and 2 show relations between the head element components and the fixing frames of the prior art head assemblies.
Figure 2:
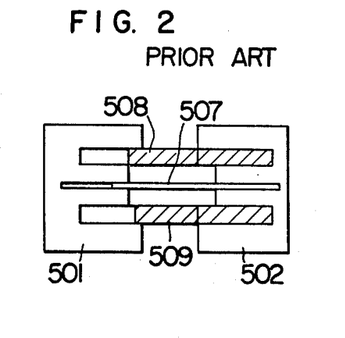

As shown in FIG. 1, in the past, in fabricating a two-channel head assembly, while head element components 503, 504, 505 and 506 are held by fixing frames 501 and 502 and a shield plate 507 is held by the fixing frame 502, the fixing frames 501 and 502 are joined together to assemble the head element by the head element components 503, 504 and 506. Alternatively, as shown in FIG. 2, head element components 508 and 509 are prefabricated, which are held by the fixing frame 502 together with the shield plate 507, and the fixed frames 501 and 502 are joined together in an integral unit.

In such structures, however, there is a limit to the amount the spacing between the head elements can be reduced.

When the fixing frames 501 and 502 are used, difficult manufacturing steps such as fitting the head elements or the head element components 503 to 506 and 508 and 509 and aligning the gaps of the head elements are experienced.

The present invention overcomes the above difficulties. The present invention is now explained with reference to the preferred embodiments thereof shown in the accompanying drawings, in which:

FIGS. 3 to 21 show embodiments of the present invention, in which;

FIG. 3 shows an example of steps to assemble a complete head assembly from the head element parts. As shown in FIG. 3E, positioned on both sides of a magnetic plate 4 (shown in FIG. 3A) having holes 1 and 2 and tabs 5 and 6 on opposite sides thereof and a slot 3 at a center thereof, are spacer 13 (shown in FIG. 3B) made of non-magnetic material and each having holes 7 and 8 corresponding to the holes 1 and 2, tabs 10 and 11 corresponding to the tabs 5 and 6, a slot 9 corresponding to the slot 3 and an aperture 12 intermediate the slot 9, and a plurality of U-shaped cores 14 (shown in FIG. 3C) are positioned on each of the spacers 13 to form a head element 15 as shown in FIG. 3E. The parts 4, 13 and 14 are bonded in a unit by bonding material. In order to simplify the explanation, as shown in FIG. 3E, the magnetic plate 4 and the non-magnetic spacers 13 on both sides thereof are identified by a shield plate 16, and the laminated cores 14 on both sides of the shield plate 16 are identified by core blocks 17 and 18. The steps thus far described include the step of bonding the spacers 13 and the cores 14 with reference to the slot 3 of the magnetic plate 4, and the parts 4, 13 and 14 can be readily mass-produced using masking technology.

Figure 3A:
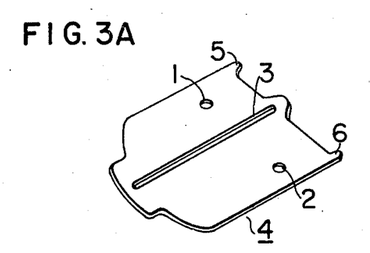
FIGS. 3 and 7 show manufacturing steps of magnetic head assemblies.
Figure 3B:
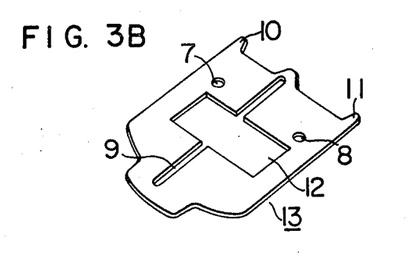
Figures 3C, 3D, 3E, 3F:
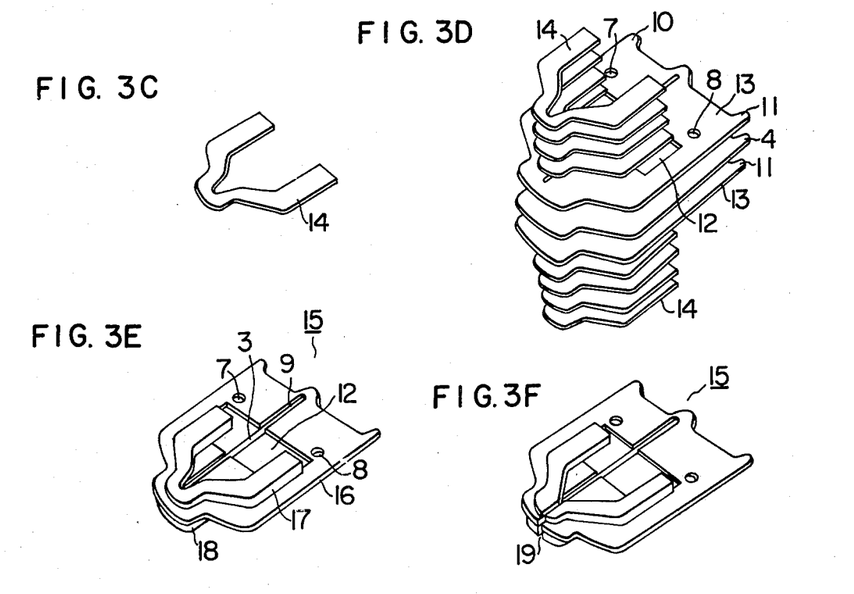
Figure 3G:
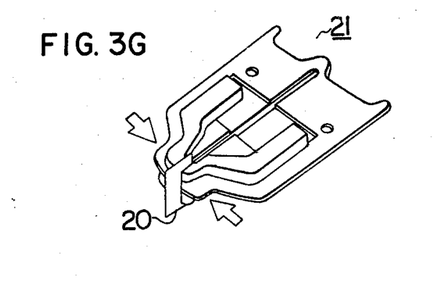
Figure 3H:
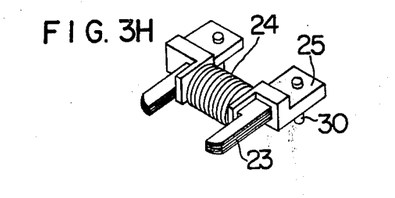
Figure 3I:
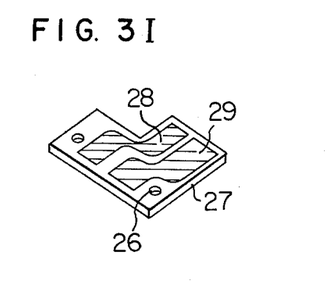

The head assembly 15 thus constructed is then partially cut by a cutter as shown in FIG. 3F to form a cut-out 19 which aligns with the slots 3 and 9, and a spacer 20 is inserted in the cut-out 19 as shown in FIG. 3G. Under this condition, the spacer 20 is fixed by bonding material while it is pressed from both sides thereof. Through those steps, a head chip 21 is formed.

Figure 3J:
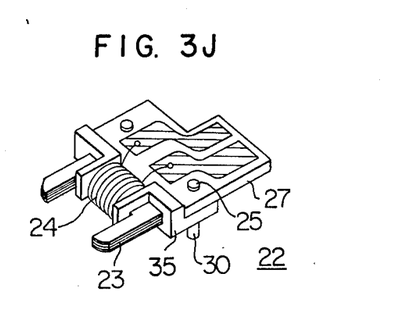
Figure 3K:
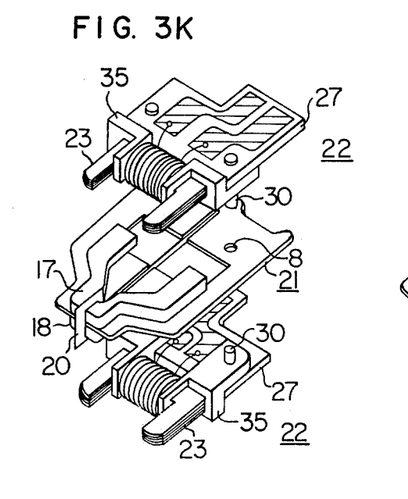
Figure 3L:
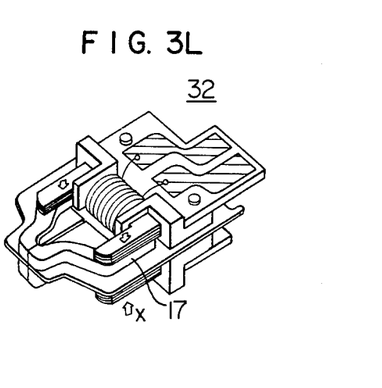
Figure 4:
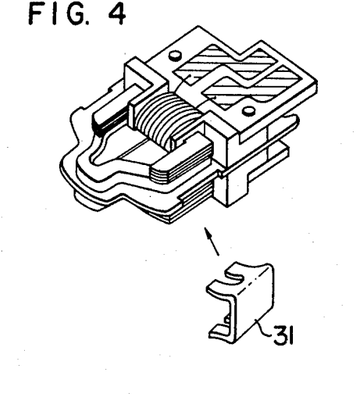
FIGS. 4 and 5 show other embodiments of the steps.

As shown in FIG. 3J, a back core section 22 comprises a U-shaped back core 23 (see FIG. 3H), a bobbin 35 having a winding 24 wound thereon and having legs 25 and 30, and a substrate 27 (shown in FIG. 3I) having a hole 26 corresponding to the leg 25. The ends of the winding 24 are electrically connected to conductive lands 28 and 29 on the substrate 27. When the back core sections 22 are fitted to the head chip 21 as shown in FIG. 3K, the back cores 23 are surface-contacted with the cores 17 and 18, and portions of the bobbins 35 are positioned to correspond to the apertures 12 formed in the spacers 13 and the legs 30 are fitted to the holes 7 and 8. The head chip 21 and the back core sections 22 are joined together by bonding material by applying pressure in a direction of an arrow X or by applying pressure by a pressure spring 31 as shown in FIG. 4. Through the above steps, a main assembly 32 of the head assembly is completed as shown in FIG. 3L.

Figure 3M:
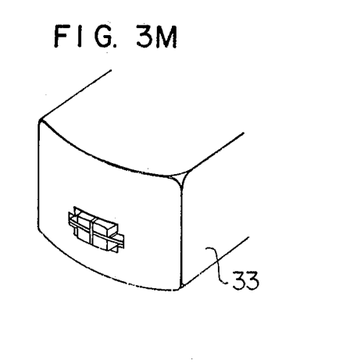
Figure 3N:
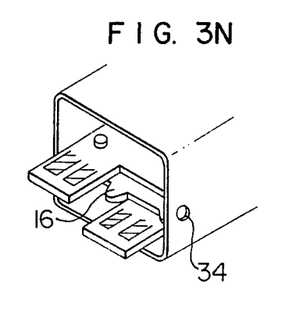

The main assembly 32 is then accommodated in a shield case 33 as shown in FIG. 3M, and the shield plate 16 is positioned by the fixing portions 5, 6, 10, 11 through holes 34 formed in the shield case 33, as shown in FIG. 3N. Then, the shield plate 116 and the shield case 33 are integrated together by conductive bonding material or by welding to fix the main assembly 32 including the shield plate 16 to the shield case 33 and to ground the shield plate 16.

Figure 5:
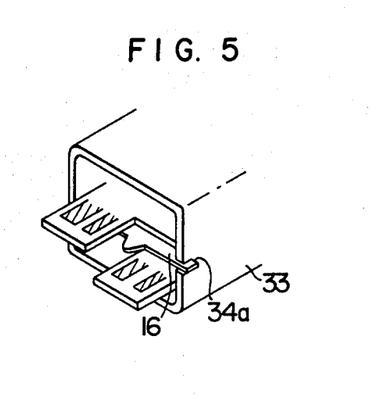

Instead of forming the holes 34 in the shield case 33, slots 34a may be formed as shown in FIG. 5 and the fixing portions 5, 6, 10, 11 of the magnetic plate 4 and the shield plates 13 may be formed to extend widthwise so that a shield plate corresponding to the shield plate 16 is engaged with the shield case 33 in a complementary relation as shown in FIG. 5.

While the main assembly 32 is accommodated and held in the shield case 33, they are integrated together by molding material and a front face of the integrated unit is grounded to complete the head assembly.

As described hereinabove in connection with the preferred embodiment, the step of forming the head components and the step of joining the head chip and the back core section can be carried out by a mere superpositioning step and the automatic assembling work is facilitated except for certain steps such as the electrical connection of the ends of the winding to the substrate.

Further, by appropriately selecting the thickness of the shield plates 16, the spacing between the head elements can be changed as desired and the fabrication of a small spacing head assembly is facilitated.

Further, since the spacer 13 has the bobbin aperture in which the bobbin 35 is partially inserted, it can hold the back core section and reduce the amount of protrusion of the bobbin in the transverse direction to the shield plate.

Figure 6:
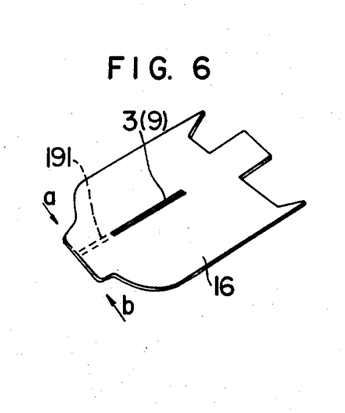
FIGS. 6, 8, 10 and 11 show perspective views of shield plates.

Now considering the shield plate 16 shown in FIG. 3, as shown in FIG. 6, a portion 191 of the shield plate 16 shown by a broken line is cut away when the spacer receiving slot is formed. The spacer is held therein and fixed while pressures are applied in the directions a and b.

However, the fixing of the cut-out portion which is formed when the spacer receiving slot is formed is not sufficiently reliable because there exists back forces in the opposite direction to the arrows a and b due to the resilience of the shield plate per se after the pressures in the directions of a and b have been released.

If a slot 3(9) is formed simultaneously with the formation of the shield plate 16, the back forces may be relieved, but the slot 3(9) reduces the shielding effect.

FIG. 7 shows another embodiment of the present invention which resolves the above problem. FIG. 7 mainly shows the relationship between a shield plate 103 having a magnetic plate 101 and spacers 102 disposed on both sides thereof, and a core block 106 disposed on the shield plate 103 and having cores 104 and 105. Although the core blocks 106 are arranged on both sides of the shield plate 103 when a multi-channel head assembly is to be formed, the cores on the lower side of the shield plate 103 are omitted in the drawing for the purpose of simplicity.

Figures 7A, 7C:
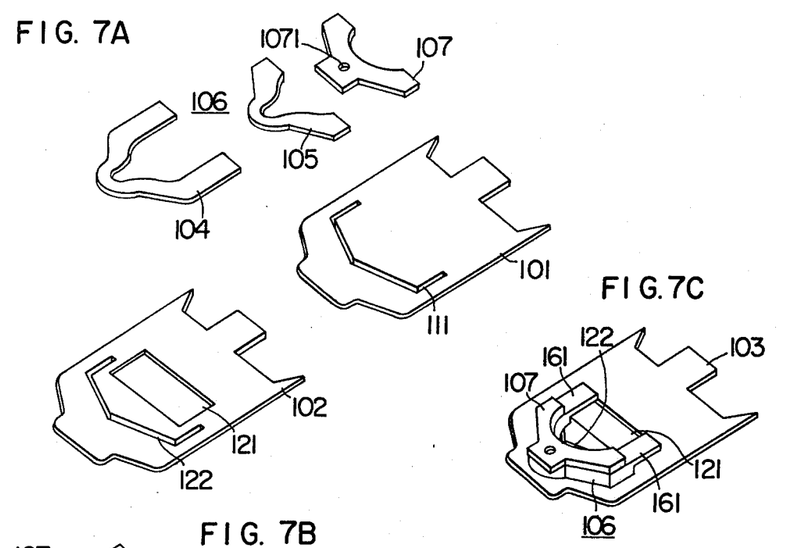
Figure 7B:
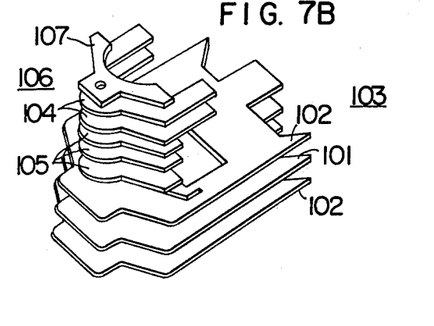

In FIG. 7A, the magnetic plate 101 has a U-shaped slot 111 and the spacer 102 has a slot 122 corresponding to the slot 111 and a winding aperture 121. Numeral 107 denotes a side core of non-magnetic material. As shown in FIG. 7B, the core block 106 comprises two laminated cores 104 and three laminated cores 105. Because of a difference of shapes of the cores 104 and 105, ends 161 protrude as shown in FIG. 7C, and the ends 161 float relative to the shield plate 103.

Figure 7D:
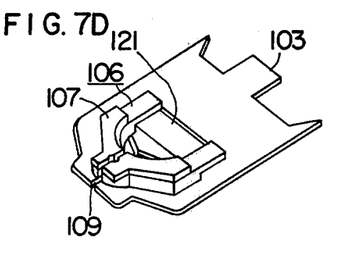
Figure 8:
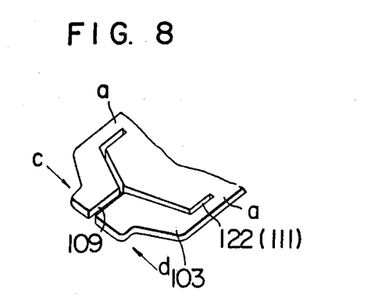

When a spacer receiving slot 109 corresponding to the slot 109 in FIG. 1 is formed in this assembly as shown in FIG. 7D to allow the insertion of a spacer 108 therein, it constitutes a Y-shaped slot as shown in FIG. 8 together with the U-shaped slot 122 (corresponding to 111) formed in the shield plate 103.

Accordingly, when pressures are applied in the directions of arrows c and d to hold the spacer 108, a tip end of the shield plate 103 moves around a point a.

Figure 7E:
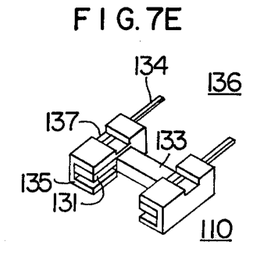
Figure 7F:
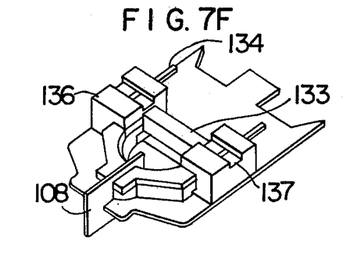
Figure 9:
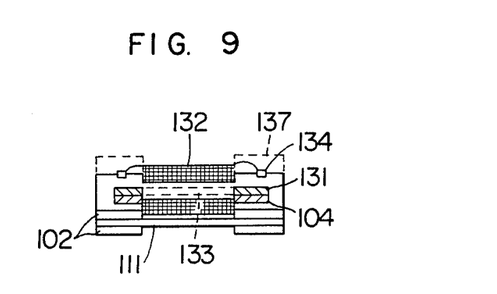
FIG. 9 shows a relation between a back core and a bobbin.

Numeral 110 shown in FIG. 7E denotes a back core section which comprises a back core 131, a portion 133 on which a winding 132 is wound as shown in FIG. 9 and a bobbin 136 having electrical terminals 134 and holes 135 to which the ends 161 of the core block 106 are mounted. Steps 137 are formed in the bobbin 136 to expose base portions of the electrical terminals 134. The winding 132 and the terminals 134 are electrically connected through the steps 137. As shown in FIG. 9, the relation between the winding 132 and the slot 122 is so designed that a large number of turns of the winding is permitted.

The relation between the winding 132 and the slots 111 and 122 formed in the shield plate 103 is so designed that the slots 111 and 122 are formed to escape the winding 132 so that the shielding effect is not reduced.

The manufacturing steps have been described thus far. According to the present embodiment, the spacer 108 can be effectively held without sacrificing the shield effect of the shield plate 103.

Furthermore, since the back core section 110 can be moved along the shield plate 103 to couple the core 106 forming a magnetic circuit to the back core 131, the assembling work is facilitated.

Furthermore, since the winding 132 is coupled to the terminals 134 at the steps 137 of the bobbin 136, the coupling portions do not protrude relative to the other portions and hence the top surface of the bobbin 136 can be effectively used in determining the spacing to the shield case.

Figure 10:
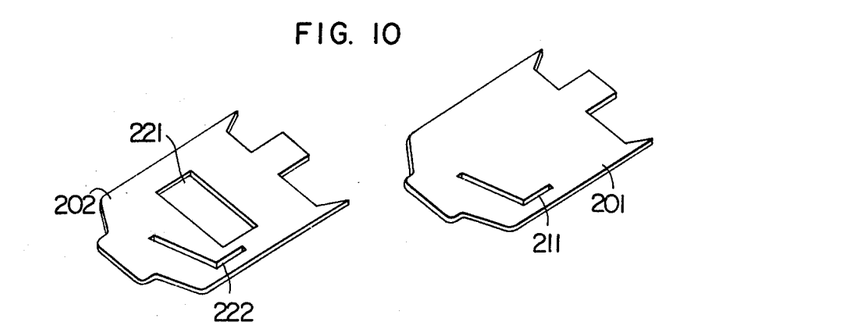

FIG. 10 shows other embodiments of the magnetic plate and the spacer corresponding to 4 and 13 in FIG. 3 and 101 and 102 in FIG. 7. A magnetic plate 201 has a generally L-shaped slot 211 near one corner edge thereof, and a spacer 202 has a slot 222 corresponding to the slot 211 and a bobbin receiving aperture 221.

Figure 11:
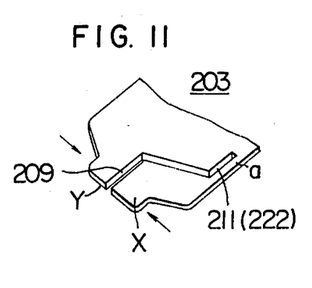

With this arrangement, when pressures are applied in the direction of arrows as shown in FIG. 11 to hold the spacer (corresponding to the spacer 20 in FIG. 3), one tip end of the shield plate 203 moves around a point a toward the other tip end.

In this manner, since only one tip end (X) of the shield plate 203 is moved around the point a in the direction of Y to establish a required gap, the amount of protrusion at Y does not change. Therefore, this portion can be used as a reference plane so that the precision of head assembling work is improved.

Figure 12A:
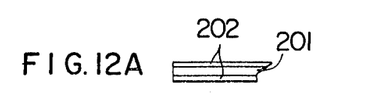
FIG. 12 shows a relation between a magnetic plate forming the shield plate and a non-magnetic plate.
Figure 12B:
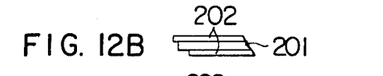
Figure 12C:
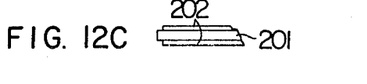

When the shield plate 203 is formed by the magnetic plate 201 and the spacer 202, it is ideal that the end surfaces of the magnetic plate 201 and the spacer 202 are coplanar as shown in FIG. 12A, but in many cases they are not coplanar as shown in FIG. 12B. By intentionally providing a step between the magnetic plate 201 and the spacer 202 as shown in FIG. 12C, the magnetic plate 201 can be used as a reference.

Figure 13:
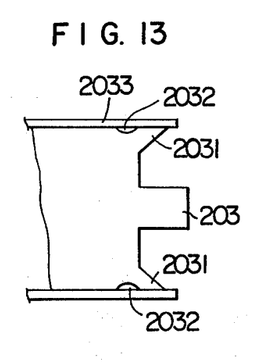
FIG. 13 shows a relation between the shield plate and a shield case.

As shown in FIG. 13, the shield plate 203 may have slots 2032 on opposite edge at one end and portions 2031 to be welded to a shield case 2033 in order to facilitate the coupling of the shield plate 23 to the shield case 2033.

Numeral 1071 in FIG. 7A denotes a hole formed in the side core 107, and it may be used as an air venting hole when bonding material is filled while the spacer 108 is held so that the precision of bonding is improved.

Figure 14:
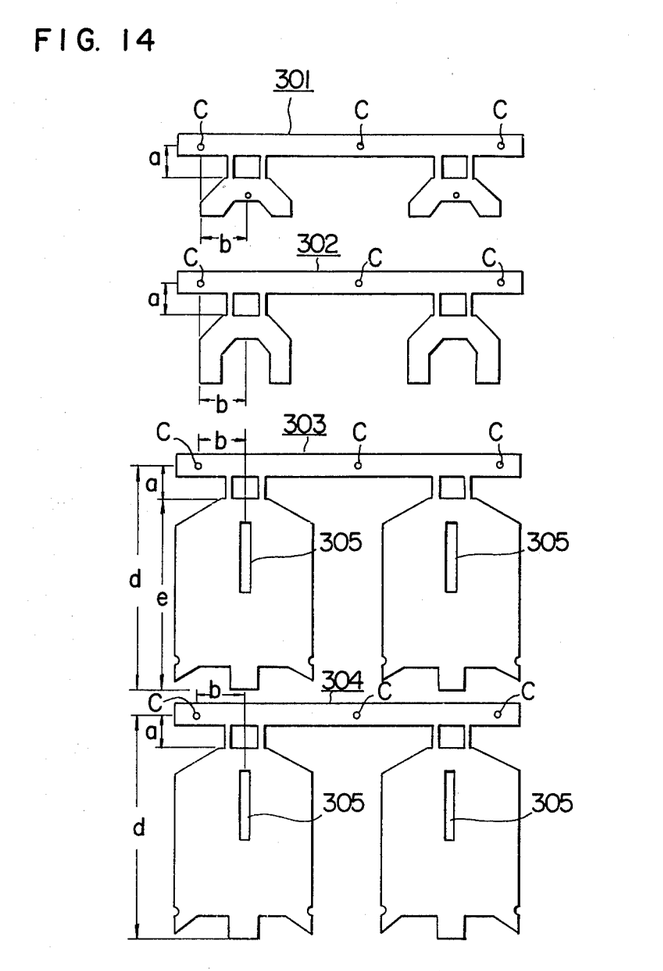
FIG. 14 shows plan views of parts used to mass-produce the magnetic head element components.

In the embodiments described above, the method of fabricating the magnetic head assembly by arranging the cores forming the head chips on both sides of the magnetic plate with the spacers made of non-magnetic material being interposed therebetween, has been explained. Another feature of the present invention while facilitates the positioning of the parts is now explained. Referring to FIG. 14, numerals 301 to 304 denote a side core component, a core component, a magnetic plate component and a spacer component, respectively formed by etching or pressing, each having reference holes c (three are shown but they may be two at the left and right ends). The dimensions a and b of each component are same as those of other components. The dimension d is equal to a+e (the length of the shield plate) and the dimension e includes a gap depth. Numeral 305 denotes a slit.

Figure 15:
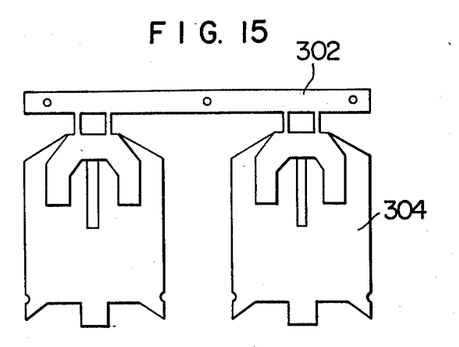
FIGS. 15 to 19 show manufacturing steps to fabricate the magnetic head assembly by those parts.
Figure 16:
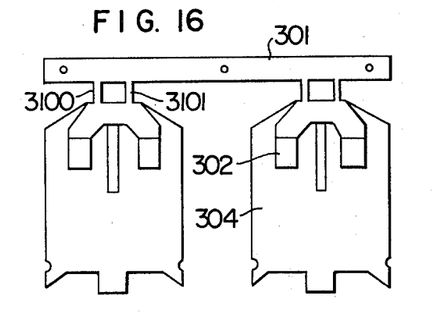

In FIG. 15, the spacer components 304 are arranged on both sides of the shield plate component 303, and the core components are arranged thereon, and in FIG. 16, the side core components 301 are also superimposed. Since the dimensions a and b of each component are same to those of other components, the positioning can be controlled by superimposing those components using the reference holes c.

Figure 17:
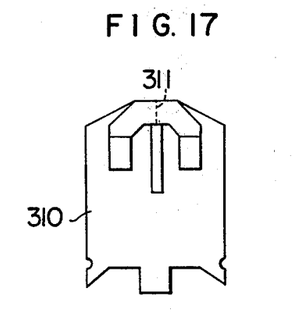
Figure 18:
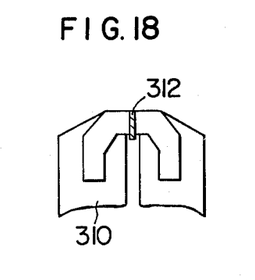

Under this condition, undesired portions are removed to form individual head assemblies 310 as shown in FIG. 17. Then, a portion 311 shown by dotted line is cut and a spacer 312 is inserted therein as shown in FIG. 18 to establish a gap.

Figure 19:
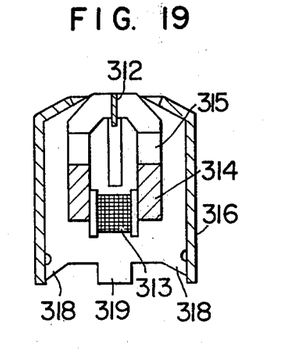

Since the dimensions a and b of the components forming the head assembly are the same to each other as shown in FIG. 14, the head assembly having a desired gap depth can be formed by grinding the front face of the head assembly, which has been accommodated in a shield case 316, by a given amount using a tab 319 as a reference. Since the dimensions a and b are the same between the components, the positioning of the components is facilitated. Numeral 315 denotes a core, 314 a back core, 313 a bobbin and 318 couplings to the shield case 316.

The slit 305 need not be of I-shape but it may be of U-shape (corresponding to 111 in FIG. 7) or L-shape (corresponding to 211 in FIG. 10). Since support members 3100 and 3101 are arranged closely to each other, the work of finishing the head assembly 310 from the step down in FIG. 16 to the step shown in FIG. 17 is facilitated.

Two types of core components 302 may be used to form cores corresponding to 104 and 105 in FIG. 7.

According to the above embodiment, the head assembly is formed by superimposing the components using the positioning holes formed in the shield plate component as a reference, and the gap depth is determined using the tab of the shield plate as a reference. Consequently, the precision is enhanced. Furthermore, since the undesired portions are removed after the head assembly has been formed, the fabrication work is facilitated.

Figure 20:
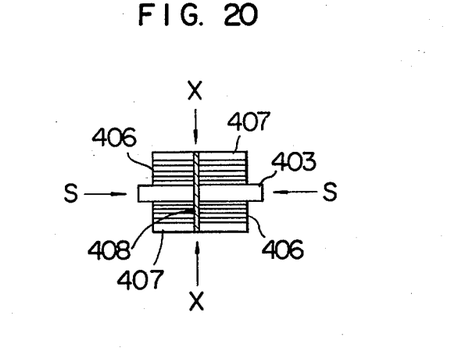
FIG. 20 shows a plan view in the course of one step thereof.

In establishing a desired gap by filling bonding material, the latter must be solidified while pressure is applied in the direction of an arrow S as shown in FIG. 20. This work is troublesome and time-consuming. Numeral 403 denotes a shield plate, 406 a core block, 407 a tape receiver, and 408 a spacer.

Figure 21:
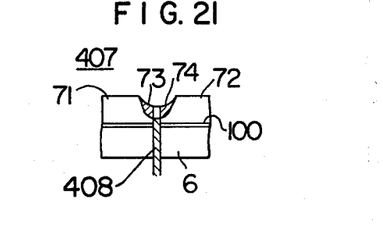
FIG. 21 illustrates a welding condition.

The side core 407 and the spacer 408 can be integrated by welding the side core 407 while it holds the spacer 408 in the cut-out portion thereof, by radiating a laser beam of an intensity which does not affect the core block 406, in the direction X as shown in FIG. 21, while applying pressure in the direction of the arrow S. In FIG. 21, numeral 73 denotes a recess formed by the laser beam irradiation, 74 a nugget, 100 a joining layer to the side core 407 and the core block 406. Only the side core 407 is welded in order to prevent adversely affecting the bonding of the joining layer 100 and affecting the characteristic of the core block 406.

Since the side core 407 is integrated with the core block 406 by welding it on the outer surface of the core block 406, the work requires less time and the precision of the integration is higher than that obtained by bonding.

When manufacturing a multi-channel head assembly, if uniform gaps are not obtained by the welding of the side cores 407 on both sides, holes are preformed (which correspond to the hole 1071 in FIG. 7) in the side cores 407 at positions to reach the shield plate 403 without intercepting the core block 406 when the side cores 407 are integrated with the core block 406, and a laser beam is radiated through the holes to weld the divided shield plates together. Where the laser beam can be radiated to the shield plate 403 without requiring the holes because of the difference between the structures of the side cores 407 and the core block 406, the holes need not be formed. The divided shield plates may be welded together from the front face of the head assembly (on which a tape runs).

Figure 22:
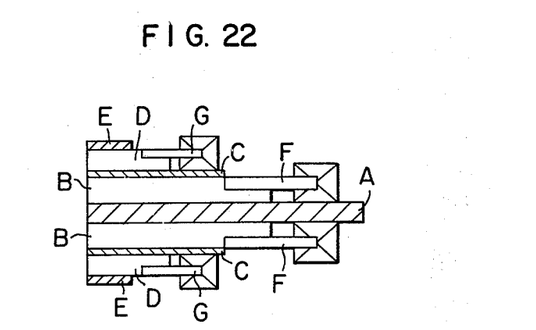
FIG. 22 shows a sectional view of a 4-channel head assembly.

FIG. 22 shows an embodiment of a 4-channel head in which a central shield plate A is used as a base, on both sides of which cores B, shield plates C, cores D and tape receivers E are integrated, and back cores F and G having windings wound thereon are fitted to the cores B and D.

As described in connection with the preferred embodiments of the present invention, the present invention provides reduction of the spacing between the head elements because the magnetic head assembly is formed while the head elements are joined on both sides of the shield plate.

According to the methods shown in FIGS. 4 to 19, the assembling work of the head assembly is expedited. Furthermore, since the superposition method is employed, the present method can be readily applied to the 4-channel head assembly. The fixing frames such as 501 and 502 shown in FIGS. 1 and 2 are no longer necessary.

What is claimed is:

1. A magnetic head of the type having a plurality of head elements and coil windings comprising:

a shield plate assembly comprising first and second nonmagnetic spacer plates disposed on each side of a magnetic plate, each of said spacer plates containing an aperture for receiving the windings of a head coil and having an auxillary slot;

first and second U-shaped cores on the free side of each spacer plate and first and second back cores;

said first and second back cores each having a head coil winding supported thereon, said back cores being located on the free side of each of said U-shaped cores with said head coils disposed within said apertures, said back cores being in magnetic coupling relationship with an adjacent U-shaped core;

said shield plate assembly and U-shaped cores having a common magnetic gap located therein adjacent an edge thereof and remote from said head coils;

a spacer located within said common magnetic gap for maintaining the spacing of said magnetic gap; and a shield case for housing said shield plate assembly, back cores, and U-shaped cores, said shield case having an opening for exposing said magnetic gap to a record medium, wherein two magnetic circuits are formed, each having a gap which is in precise alignment with the remaining gap but separated therefrom.

2. A magnetic head according to claim 1, wherein said spacer auxiliary slot is an I-shaped slot communicating with said aperture.

3. A magnetic head according to claim 1 wherein said spacer auxiliary slot is a U-shaped slot formed around said aperture.

4. A magnetic head according to claim 1, wherein said spacer auxiliary slot is an L-shaped slot formed around said aperture.

5. A magnetic head according to claim 1, wherein a said core is provided on the outer surface of said U-shaped cores.

6. A magnetic head according to claim 1, further comprising: a second set of shield plates each having both surfaces coated with a non-magnetic layer and disposed on the respective outside surface of said first pair of U-shaped cores, and a second pair of U-shaped cores each closely coupled via the respective second shield plate on the respective first U-shaped cores, and a second set of back cores each forming a closed magnetic circuit with the respective second U-shaped core.

7. A multichannel magnetic head comprising:
a shield plate assembly comprising at least one magnetic plate defining a predetermined channel spacing, said magnetic plate having a longitudinal slot, and at least one spacer plate of non-magnetic material located on each surface of said magnetic plate, said spacer plate having a longitudinal slot coincident with said magnetic plate slot, and a larger slot at the midsection of said longitudinal slot;
first and second U-shaped cores each comprising a plurality of U-shaped magnetic plates to define a predetermined channel width, said cores being located against each spacer plate whereby said predetermined channel width is centered with respect to said longitudinal slot;
first and second back cores located on each of said U-shaped cores, said back cores having a core portion disposed over said larger slot for supporting a winding in said slot, said back cores forming a magnetic circuit with an adjacent U-shaped core;
said U-shaped cores, shield plate assembly having a common slot formed along an outside surface adjacent an edge thereof and remote from said head coils for providing a magnetic gap;
a spacer inserted in said gap; and
a shield case for enclosing said shield plate assembly, U-shaped cores and two back cores, said shield core having an opening corresponding to the location of said gap whereby said gap is exposed for contacting a recording surface, said gap being common to two magnetic circuits whereby said magnetic circuits are maintained in precise alignment.

* * * * *